US008379781B2

United States Patent
Yang et al.

(10) Patent No.: US 8,379,781 B2
(45) Date of Patent: Feb. 19, 2013

(54) APPARATUS AND METHOD FOR ADAPTIVE RECEIVE SIGNAL DECODING BASED ON CHANNEL VARIATION IN COMMUNICATION SYSTEM

(75) Inventors: Joo-Yeol Yang, Suwon-si (KR); Sung-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1114 days.

(21) Appl. No.: 12/313,884

(22) Filed: Nov. 25, 2008

(65) Prior Publication Data

US 2009/0135963 A1    May 28, 2009

(30) Foreign Application Priority Data

Nov. 26, 2007 (KR) .................. 10-2007-0120856

(51) Int. Cl.
*H04B 14/06* (2006.01)
(52) U.S. Cl. ......... 375/347; 375/350; 375/299; 375/267
(58) Field of Classification Search .................. 375/340, 375/341, 346, 347, 260
See application file for complete search history.

(56) References Cited

U.S. PATENT DOCUMENTS

| 7,242,724 | B2 * | 7/2007 | Alexiou et al. ............... 375/267 |
| 8,068,566 | B2 * | 11/2011 | Sudhakar et al. ............. 375/341 |
| 2005/0265475 | A1 | 12/2005 | Sun et al. | |
| 2006/0182207 | A1 | 8/2006 | Lee et al. | |

OTHER PUBLICATIONS

Alamouti, Siavash M.; "A Simple Transmit Diversity Technique for Wireless Communications" IEEE Journal on Select Areas in Communications, vol. 16, No. 8, Oct. 1998; pp. 1451-1458.

* cited by examiner

*Primary Examiner* — David Ometz
*Assistant Examiner* — Qutbuddin Ghulamali (57) ABSTRACT

An apparatus for adaptively decoding based on a channel variation at a receiver of a communication system supporting an Alamouti mode is provided. The apparatus includes a channel variation estimator for estimating the channel variation; a channel estimator for estimating a channel value of successive channel periods or a channel value of each channel period by comparing the estimated channel variation with a threshold; an Alamouti decoder for decoding a receive signal using an Alamouti method when the estimated channel variation is less than or equal to the threshold; and a Spatial Multiplexing (SM) decoder for decoding the receive signal using an SM method having a square channel matrix when the estimated channel variation is greater than the threshold.

17 Claims, 7 Drawing Sheets

APPARATUS AND METHOD FOR ADAPTIVE RECEIVE SIGNAL DECODING BASED ON CHANNEL VARIATION IN COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Nov. 26, 2007 and assigned Serial No. 10-2007-0120856, the entire disclosure of which is hereby incorporated by reference.

TECHNICAL FIELD OF THE INVENTION

The present invention relates generally to an apparatus and a method for adaptively decoding a receive signal according to a channel variation in a communication system. More particularly, the present invention relates to a method and an apparatus for adaptively performing Alamouti-Space Time Block Coding (STBC) decoding or Spatial Multiplexing (SM) decoding based on a channel variation using a SM decoder of a square channel matrix structure at a receiver of the communication system.

BACKGROUND OF THE INVENTION

Figure 1:
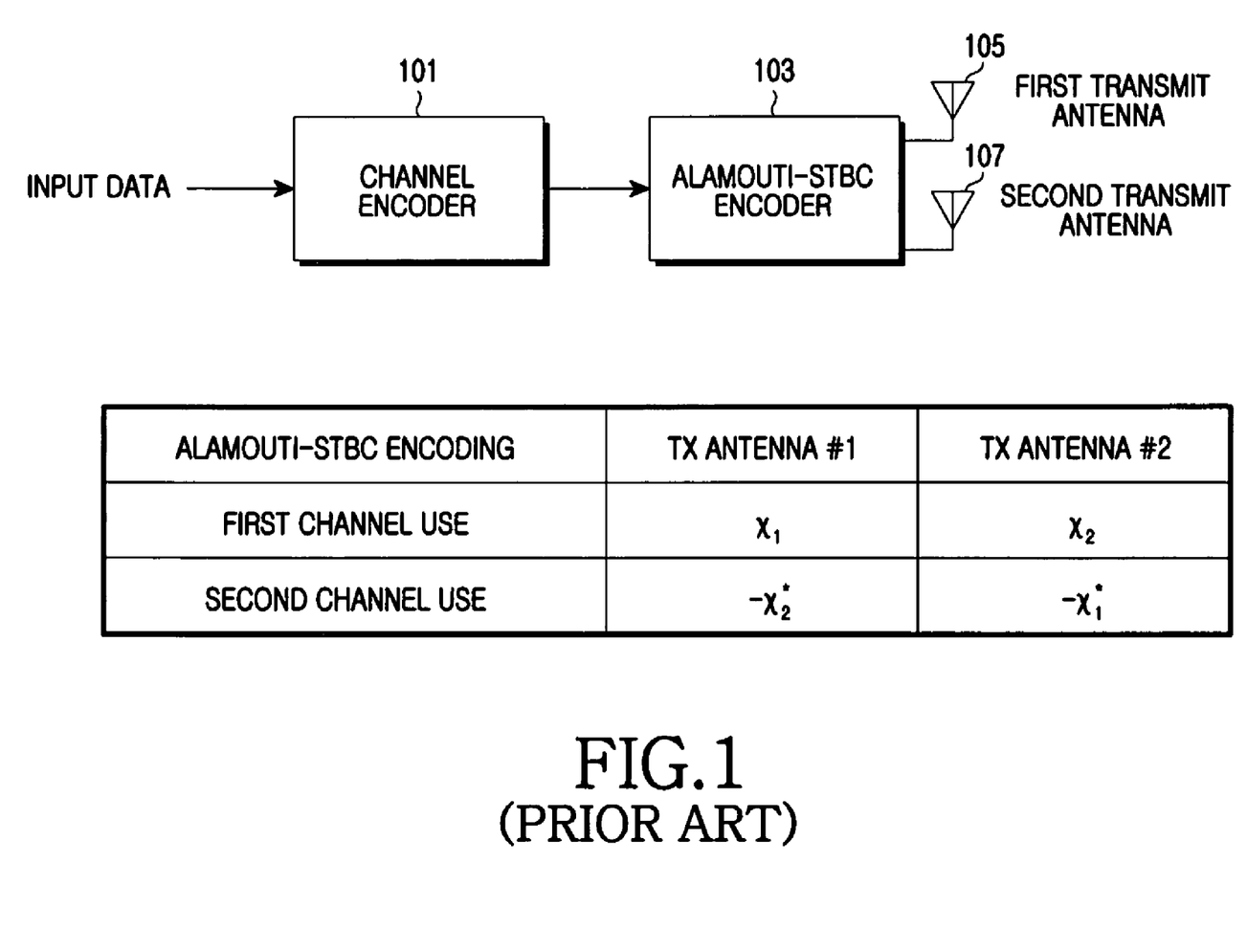
FIG. 1 illustrates a structure and a transmission method of a conventional transmitter using Alamouti-Space Time Block Coding (STBC) in a communication system.

Alamouti-Space Time Block Coding (STBC) and Alamouti-Space Frequency Block Coding (SFBC) aim to enhance a reception performance, compared to a conventional single antenna system, by virtue of a spatial diversity in a fading channel by coding a signal in time and space axes or frequency and space axes using multiple antennas at a transmitter. For instance, according to the Alamouti-STBC, the transmitter of FIG. 1 encodes a signal channel-encoded at a channel encoder 101 through an Alamouti-STBC encoder 103 in the time and space axis, and then transmits two transmit symbols via two transmit antennas 105 and 107 in symbol periods at the same time. The receiver receives the signal of the two transmit symbols via receive antennas.

As the enhanced reception performance using the Alamouti-STBC leads to the increase of a system capacity and the extension of a cell coverage, the Alamouti-STBC is adopted to various commercial systems such as mobile WiMax system or Long Term Evolution (LTE) system.

Usually when a transmitter of a communication system transmits a signal using the Alamouti-STBC, a receiver can receive the signal and differ the decoding scheme according to the channel condition. The receive signal of the receiver in the system using the Alamouti-STBC is expressed as Equation 1:

$$y = Hx + u, \quad \text{[Eqn. 1]}$$

$$\begin{bmatrix} y_1(1) \\ y_1^*(2) \\ y_2(1) \\ y_2^*(2) \end{bmatrix} = \begin{bmatrix} h_{11}(1) & h_{12}(1) \\ h_{12}^*(2) & -h_{11}^*(2) \\ h_{21}(1) & h_{22}(1) \\ h_{22}^*(2) & -h_{22}^*(2) \end{bmatrix} \begin{bmatrix} x_1 \\ x_2 \end{bmatrix} + \begin{bmatrix} u_1(1) \\ u_1^*(2) \\ u_2(1) \\ u_2^*(2) \end{bmatrix}.$$

In Equation 1, y denotes a receive signal vector, $y_i(t)$ denotes a receive signal in the t-th symbol period (or the t-th subcarrier) over the i-th receive antenna, H denotes a channel matrix, and $h_{ij}(t)$ denotes a channel gain in the t-th symbol period (or the t-th subcarrier) between the i-th receive antenna and the j-th transmit antenna. Further, x denotes a transmit symbol vector, $x_j$ denotes a transmit symbol over the j-th transmit antenna, u denotes a background noise, and $u_i(t)$ denotes a background noise in the t-th symbol period (or the t-th subcarrier) at the i-th receive antenna.

When the channel in the period adopting the Alamouti-STBC is a static channel; that is, the channel is constant in successive symbol periods (or successive subcarriers), the Alamouti-STBC attains orthogonality as expressed in Equation 2. Accordingly, the receiver can distinguish the two transmit symbols, to ensure the optimal reception performance and design the receiver with the low implementation complexity.

$$\text{Assumption: } h_{11} = h_{11}(1) = h_{11}(2), \ h_{12} = h_{12}(1) = h_{12}(2), \quad \text{[Eqn. 2]}$$

$$h_{21} = h_{21}(1) = h_{21}(2), \ h_{22} = h_{22}(1) = h_{22}(2)$$

$$H^H = \begin{bmatrix} h_{11}^* & h_{12} & h_{21}^* & h_{22} \\ h_{12}^* & -h_{11} & h_{22}^* & -h_{21} \end{bmatrix}$$

$$\hat{x} = H^H y, \ \begin{bmatrix} \hat{x}_1 \\ \hat{x}_2 \end{bmatrix} = \begin{bmatrix} \alpha & 0 \\ 0 & \alpha \end{bmatrix} \begin{bmatrix} x_1 \\ x_2 \end{bmatrix} = \begin{bmatrix} v_1 \\ v_2 \end{bmatrix}$$

$$\alpha = |h_{11}|^2 + |h_{12}|^2 + |h_{21}|^2 + |h_{22}|^2.$$

As given by Equation 2, assuming the static channel indicative of less channel variation in the successive symbol periods (or the successive subcarriers), the receiver decodes the two transmit symbols independently.

However, in the reception assuming the static channel environment, when the channel is varied and the static channel environment is not sustained, interference signals are generated between the two transmit symbols and thus the performance is degraded. For the non-static channel environment, a method for receiving the transmit symbol with the Alamouti-STBC adopted is demanded.

When the channel in the period of the Alamouti-STBC is the non-static channel; that is, when the channel is inconstant over the successive symbol periods (or the successive subcarriers), the Alamouti-STBC does not obtain the orthogonality. The receive signal is similar to the receive signal of a Spatial Multiplexing mode which employs two transmit antennas and four receive antennas. When the transmitter uses the Alamouti-STBC and the channel is inconstant, the conventional receiver adopts the SM reception scheme such as Minimum Mean Squared Error (MMSE).

Typically, the system using the Alamouti-STBC also supports the SM technique using the multi-antenna. Herein, the SM technique raises a data transfer rate by transmitting independent data over the multiple antennas at the same time.

In a system using the same number of transmit antennas and receive antennas, when the transmit symbol of the Alamouti-STBC is decoded according to the SM reception scheme, the magnitude of a channel matrix used is greater than that of the channel matrix of an SM receiver. For example, in the system using two transmit antennas and two receive antennas, the SM receiver uses 2×2 channel matrix. By contrast, 4×2 channel matrix is used to decode the transmit symbol of the Alamouti-STBC according to the SM reception scheme.

Figure 2:
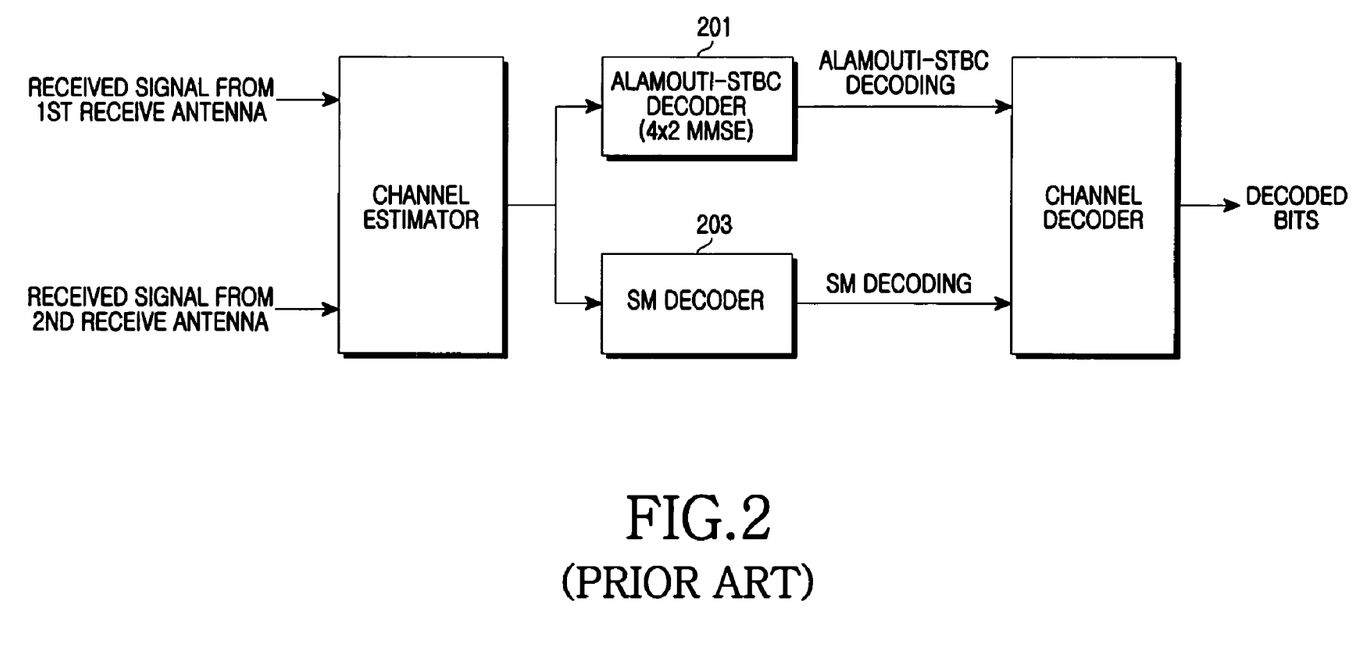
FIG. 2 illustrates a structure of a conventional receiver supporting both of the Alamouti-STBC and Spatial Multiplexing (SM) in the communication system.

Accordingly, as shown in FIG. 2, even though the receiver of the conventional communication system supports the Alamouti-STBC and the SM at the same time, an Alamouti-STBC decoder 201 including the MMSE using the 4×2 channel matrix is designed separately from an SM decoder 203. In this situation, the complexity of the receiver increases.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for adaptively decoding a receive signal according to a channel variation in a communication system.

Another aspect of the present invention is to provide an apparatus and a method for decoding a receive signal so as to minimize complexity of a receiver which supports both of Alamouti-Space Time Block Coding (STBC) and Spatial Multiplexing (SM) in a communication system.

Yet another aspect of the present invention is to provide a method and an apparatus for adaptively performing Alamouti-STBC decoding or SM decoding based on a channel variation using an SM decoder having a square channel matrix at a receiver of a communication system.

The above aspects are achieved by providing an apparatus for adaptively decoding based on a channel variation at a receiver of a communication system supporting an Alamouti mode. The apparatus includes a channel variation estimator for estimating the channel variation; a channel estimator for estimating a channel value of successive channel periods or a channel value of each channel period by comparing the estimated channel variation with a threshold; an Alamouti decoder for decoding a receive signal using an Alamouti method when the estimated channel variation is less than or equal to the threshold; and an SM decoder for decoding the receive signal using an SM method having a square channel matrix when the estimated channel variation is greater than the threshold.

According to one aspect of the present invention, a method for adaptively decoding based on a channel variation at a receiver of a communication system supporting an Alamouti mode, includes estimating the channel variation; estimating a channel value of successive channel periods or a channel value of each channel period by comparing the estimated channel variation with a threshold; and decoding a receive signal using an Alamouti method or using am SM method having a square channel matrix by comparing the estimated channel matrix with the threshold.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide an apparatus and a method for adaptively conducting Alamouti-Space Time Block Coding (STBC) or Spatial Multiplexing (SM) based on a channel variation using an SM decoder having a square channel matrix at a receiver of a communication system.

Mostly, in a system supporting both the Alamouti-STBC mode and the SM mode, the number of antennas of the receiver is determined by the SM scheme. While the Alamouti-STBC enables a signal receive antenna to receive a signal, the SM does not allow the reception of the receive antennas smaller than the transmit antennas in number. That is, the Alamouti-STBC has no limitation on the number of the receive antennas, whereas the SM restricts the number of the receive antennas greater than or equal to the number of the transmit antennas. For this reason, most of the systems make the number of the receive antennas equal the number of the transmit antennas. Hereinafter, it is assumed that a system includes a transmitter having two transmit antennas and a receiver having two receive antennas. It is assumed that the receiver already knows which of the Alamouti-STBC and the SM is adopted at the transmitter, and that the receiver supports a mode corresponding to the scheme adopted at the transmitter.

The present invention is applicable to both of the Alamouti-STBC which codes signals in a time axis and a space axis using multiple antennas, and the Alamouti-Space Frequency Block Coding (SFBC) which codes signals in a frequency axis and a space axis using multiple antennas. By way of example, the Alamouti-STBC is illustrated. In the following, a channel use of the Alamouti-STBC indicates a symbol period in the time axis of the data transmission, and a channel use of the Alamouti-SFBC indicates a subcarrier in the frequency axis of the data transmission.

Figure 3:
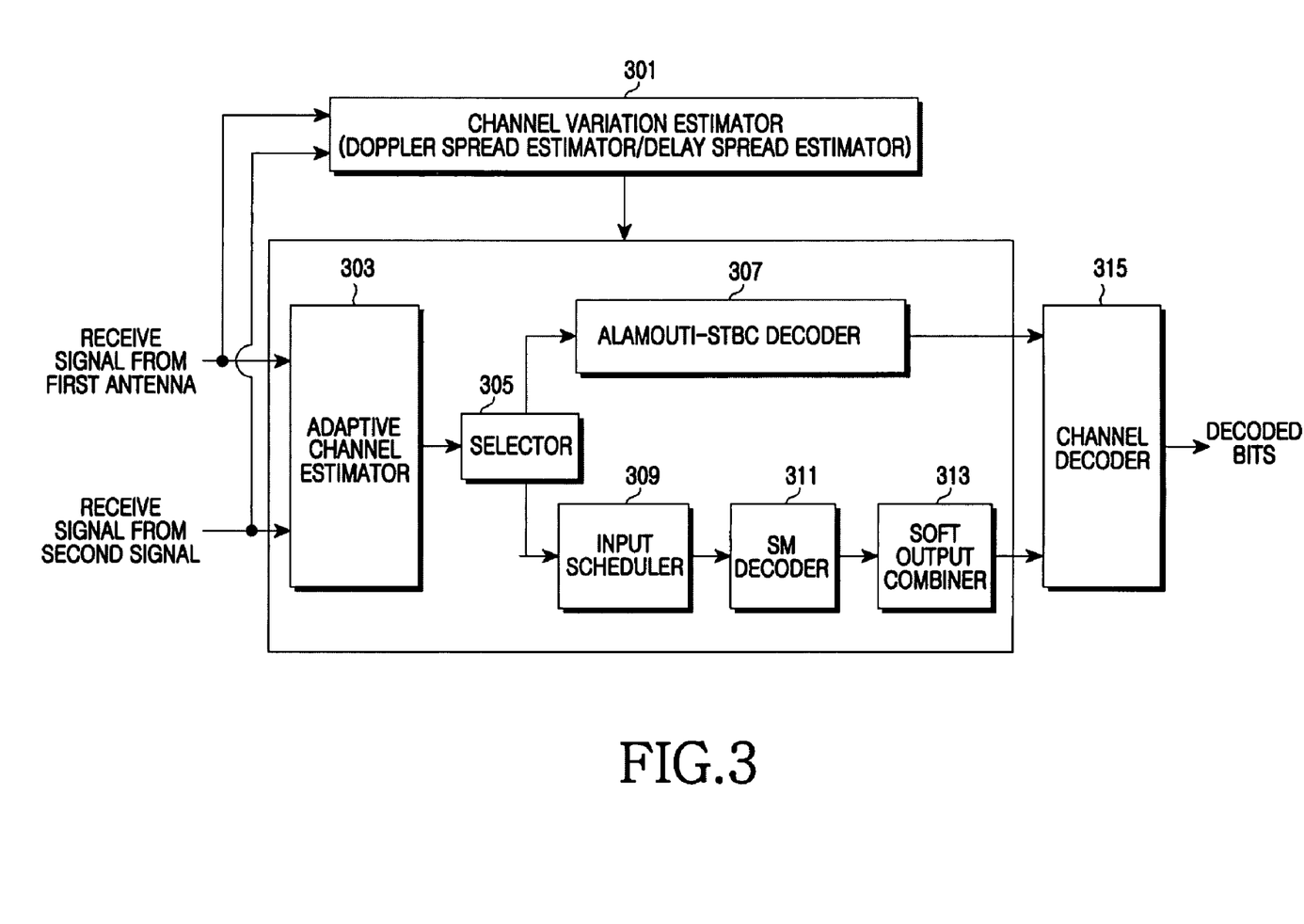
FIG. 3 illustrates a receiver supporting both the Alamouti-STBC and the SM in a communication system according to an exemplary embodiment of the present invention.

FIG. 3 is a block diagram of a receiver supporting both the Alamouti-STBC and the SM in a communication system according to an exemplary embodiment of the present invention.

The receiver of FIG. 3 includes a channel variation estimator 301, an adaptive channel estimator 303, a selector 305, an Alamouti-STBC decoder 307, an input scheduler 309, an SM decoder 311, a soft output combiner 313, and a channel decoder 315.

The channel variation estimator 301 estimates a channel variation between the transmitter and the receiver. When the transmitter adopts the Alamouti-STBC, the channel variation estimator 301 can use a Doppler spread estimator. When the transmitter adopts the Alamouti-SFBC, the channel variation estimator 301 can use a delay spread estimator.

The adaptive channel estimator 303 determines whether the channel is static or non-static by comparing the channel variation estimated at the channel variation estimator 301 with a threshold, and conducts the adaptive channel estimation according to a result of the determination. Further, the when the channel variation is less the threshold, the adaptive channel estimator 303 determines the static channel and estimates the channel value over successive symbol periods (or successive subcarriers). When the channel variation is greater than or equal to the threshold, the adaptive channel estimator 303 determines the non-static channel and estimates a separate channel value for each symbol period (or subcarrier).

The selector 305 selects a decoding scheme according to the channel variation estimated at the channel variation estimator 301 and outputs the estimation result of the adaptive channel estimator 303 to the Alamouti-STBC decoder 307 or the input scheduler 309. Further, when the channel variation corresponds to the static channel, the selector 305 determines to decode the signal using the Alamouti-STBC and outputs the receive signal to the Alamouti-STBC decoder 307. When the channel variation corresponds to the non-static channel, the selector 305 determines to decode the signal using the SM and outputs the receive signal to the input scheduler 309.

When the channel between the transmitter and the receiver is static, the Alamouti-STBC decoder 307 performs the Alamouti-decoding as in the conventional method and outputs the decoding result to the channel decoder 315. That is, the Alamouti-STBC decoder 307 decodes the transmit symbols using a channel matrix as expressed in Equation 3.

Figure 4A:
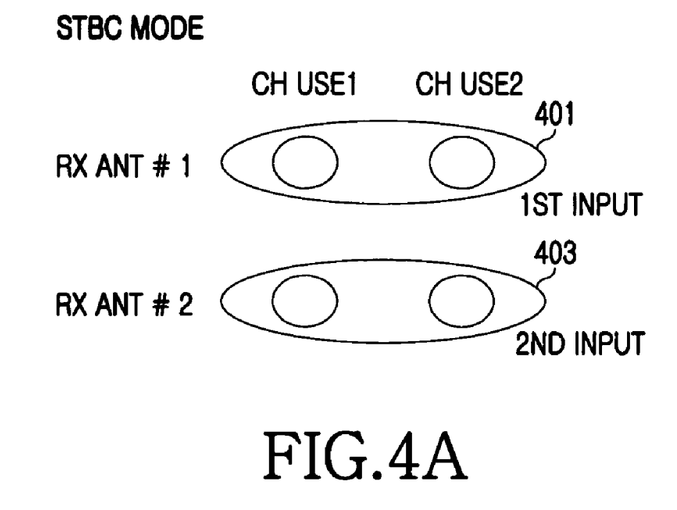
FIGS. 4A and 4B illustrate a method for regulating an input signal according to a channel variation in the communication system according to an exemplary embodiment of the present invention.
Figure 4B:
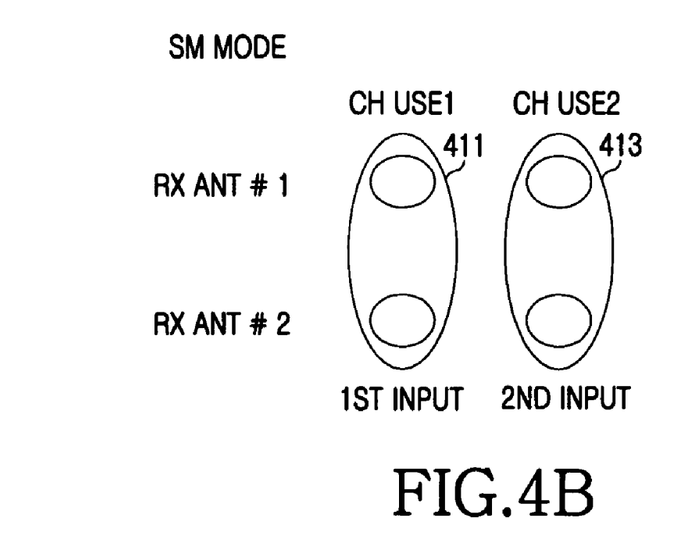

The input scheduler 309 regulates the signal output from the selector 305 depending on which of the Alamouti-STBC and the SM is adopted at the transmitter, and provides the signal to the SM decoder 311. This is because the magnitude of the channel matrix used to decode the transmit symbols of the Alamouti-STBC using the SM is different from the channel matrix magnitude of the SM decoder 311, and input signal patterns of the Alamouti-STBC and the SM are different from each other in the system including the same numbers of the transmit antennas and the receive antennas. On account of those reasons, the input scheduler 309 modifies the input signal pattern according to the Alamouti-STBC mode as shown by first input 401 and second input 403 or the SM mode as shown by first input 411 and second input 413 as illustrated in FIGS. 4A and 4B.

For instance, in a system using two transmit antennas and two receive antennas, the Alamouti-STBC receive signal received over the non-static channel can be expressed as Equation 3:

$$y = Hx + u \qquad [\text{Eqn. 3}]$$

$$\begin{bmatrix} y_1(1) \\ y_1^*(2) \\ y_2(1) \\ y_2^*(2) \end{bmatrix} = \begin{bmatrix} h_{11}(1) & h_{12}(1) \\ h_{12}^*(2) & -h_{11}^*(2) \\ h_{21}(1) & h_{22}(1) \\ h_{22}^*(2) & -h_{22}^*(2) \end{bmatrix} \begin{bmatrix} x_1 \\ x_2 \end{bmatrix} + \begin{bmatrix} u_1(1) \\ u_1^*(2) \\ u_2(1) \\ u_2^*(2) \end{bmatrix}.$$

In Equation 3, y denotes a receive signal vector, $y_i(t)$ denotes a receive signal in the t-th symbol period (or the t-th subcarrier) over the i-th receive antenna, H denotes a channel matrix, and $h_{ij}(t)$ denotes a channel gain in the t-th symbol period (or the t-th subcarrier) between the i-th receive antenna and the j-th transmit antenna. Further, x denotes a transmit symbol vector, $x_j$ denotes a transmit symbol over the j-th transmit antenna, u denotes a background noise, and $u_i(t)$ denotes a background noise in the t-th symbol period (or the t-th subcarrier) at the i-th receive antenna.

To apply the SM reception scheme to the receive signal without separate operations, a bigger channel matrix than the channel matrix used at the receiver designed for the reception in the SM mode is required. To achieve an optimal reception performance, calculations of Equation 4 are needed:

$$\hat{z}_{ML} = \min_{x_k \in A} \|y - Hx_k\|^2 \qquad [\text{Eqn. 4}]$$

$$= \min_{x_k \in A} \begin{pmatrix} |y_1(1) - h_{11}(1)x_{1,k} - h_{12}(1)x_{2,k}|^2 + |y_1^*(2) - h_{12}^*(2)x_{1,k} - h_{11}^*(1)x_{2,k}|^2 + \\ |y_2(1) - h_{21}(1)x_{1,k} - h_{22}(1)x_{2,k}|^2 + |y_2^*(2) - h_{22}^*(2)x_{1,k} - h_{21}^*(1)x_{2,k}|^2 \end{pmatrix}.$$

In Equation 4, $\hat{z}_{ML}$ denotes a soft decision output. In hard decision, the transmit symbol is demodulated by slicing the soft decision output. In the concatenation with the channel code, the soft decision output is fed to the channel decoder 315. A denotes every combination of the transmit symbol vector.

As above, since the Alamouti-STBC receive signal requires 4×2 channel matrix, the input scheduler 309 splits the receive signal per receive antenna based on Equation 5 and provides the split signals to the SM decoder 311 so as to utilize a conventional receiver for the SM mode.

Received signal in first receive antenna: $y_1 = H_1 x_1 + u_1$ [Eqn. 5]

$$\begin{bmatrix} y_1(1) \\ y_1^*(2) \end{bmatrix} = \begin{bmatrix} h_{11}(1) & h_{12}(1) \\ h_{11}^*(2) & -h_{11}^*(2) \end{bmatrix} \begin{bmatrix} x_1 \\ x_2 \end{bmatrix} + \begin{bmatrix} u_1(1) \\ u_1^*(2) \end{bmatrix}$$

Received signal in second receive antenna: $y_2 = H_2 x_2 + u_2$

-continued $$\begin{bmatrix} y_2(1) \\ y_2^*(2) \end{bmatrix} = \begin{bmatrix} h_{21}(1) & h_{22}(1) \\ h_{21}^*(2) & -h_{21}^*(2) \end{bmatrix} \begin{bmatrix} x_1 \\ x_2 \end{bmatrix} + \begin{bmatrix} u_2(1) \\ u_2^*(2) \end{bmatrix}.$$

In Equation 5, $y_1(1)$ and $y_1^*(2)$ denote signals received via the first antenna in two successive symbol (or subcarrier) periods, and $y_2(1)$ and $y_2^*(2)$ denote signals received via the second antenna in the two successive symbol (or subcarrier) periods.

More specifically, in the Alamouti-STBC mode, the input scheduler 309 regulates the pattern of the input signal to provide the signals received via the first antenna in the successive two symbol (or subcarrier) periods to the SM decoder 311 at the same time. Next, the input scheduler 309 regulates the pattern of the input signal to provide the signals received via the second antenna in the successive two symbol (or subcarrier) periods to the SM decoder 311 at the same time. In the SM mode, the input scheduler 309 regulates the pattern of the input signal to provide the signals received via the first antenna and the second antenna in one symbol (or subcarrier) period to the SM decoder 311 at the same time.

The SM decoder 311 is a decoder having a square channel structure for the conventional SM. In this embodiment of the present invention, the SM decoder 311 is used in both of the Alamouti-STBC mode and the SM mode. In the Alamouti-STBC mode with the non-static channel, the SM decoder 311 receives and decodes the receive signal from the input scheduler 309 based on Equation 5. For example, in the Alamouti-STBC mode, the SM decoder 311 conducts the decoding two times per receive antenna based on Equation 6.

Equation 6 assumes that the SM decoder 311 utilizes a Maximum Likelihood (ML) decoding scheme. Various algorithms such as MML can be applied.

$$\hat{z}_1 = \min_{x_{k_1} \in A} (|y_1(1) - h_{11}(1)x_{1,k_1} - h_{12}(1)x_{2,k_1}|^2 + \quad \text{[Eqn. 6]}$$

$$|y_1^*(2) - h_{12}^*(2)x_{1,k_1} - h_{11}^*(1)x_{2,k_1}|^2)$$

$$\hat{z}_2 = \min_{x_{k_2} \in A} (|y_1(1) - h_{21}(1)x_{1,k_2} - h_{22}(1)x_{2,k_2}|^2 +$$

$$|y_1^*(2) - h_{22}^*(2)x_{1,k_2} - h_{21}^*(1)x_{2,k_2}|^2)$$

In Equation 6, $\hat{z}_1$ and $\hat{z}_2$ denote the soft decision output.

In the Alamouti-STBC mode, the soft output combiner 313 combines the soft decision outputs $\hat{z}_1$ and $\hat{z}_2$ fed from the SM decoder 311. In the SM mode, the soft output combiner 313 passes the soft decision outputs from the SM decoder 311 and outputs them to the channel decoder 315. Herein, when the soft output combiner 313 combines the soft decision outputs acquired by decoding on the two antennas respectively, Equation 7 is produced:

$$\hat{z}_{ML} \approx \hat{z} = \hat{z}_1 + \hat{z}_2 \quad \text{[Eqn. 7]}$$

$$\min_{x_k \in A} \begin{pmatrix} |y_1(1) - h_{11}(1)x_{1,k_1} - h_{12}(1)x_{2,k_1}|^2 + |y_1^*(2) - h_{12}^*(2)x_{1,k_1} - h_{11}^*(1)x_{2,k_1}|^2 + \\ |y_2(1) - h_{21}(1)x_{1,k_2} - h_{22}(1)x_{2,k_2}|^2 + |y_2^*(2) - h_{22}^*(2)x_{1,k_2} - h_{21}^*(1)x_2, k_2|^2 \end{pmatrix}$$

$$\approx \min_{x_{k_1} \in A} (|y_1(1) - h_{11}(1)x_{1,k_1} - h_{12}(1)x_{2,k_1}|^2 + |y_1^*(2) - h_{12}^*(2)x_{1,k_1} - h_{11}^*(1)x_{2,k_1}|^2) +$$

$$\min_{x_{k_2} \in A} (|y_1(1) - h_{21}(1)x_{1,k_2} - h_{22}(1)x_{2,k_2}|^2 + |y_1^*(2) - h_{22}^*(2)x_{1,k_2} - h_{21}^*(1)x_{2,k_2}|^2).$$

In Equation 7, when $x_{k_1}$ is equal to $x_{k_2}$ ($x_{k_1} = x_{k_2}$), the sum of $\hat{z}_1$ and $\hat{z}_2$ is exactly equal to $\hat{z}_{ML}$. In other cases, the sum of $\hat{z}_1$ and $\hat{z}_2$ approximates $\hat{z}_{ML}$. The two soft decision outputs can be combined in various manners, for example, using Equal Gain Combining (EGC). When the performance per receive antenna is guaranteed over a certain degree, the symbol vectors for minimizing the Euclidean distances are the same, which equals the optimal soft decision output. Thus, the optimal reception performance is ensured. In cases against those assumptions, the combined soft decision outputs differ from the optimal soft decision output, to thus degrade the performance.

The channel decoder 315 channel-decodes the decoded signal output from the Alamouti-STBC decoder 307 or the soft output combiner 313.

Figure 5:
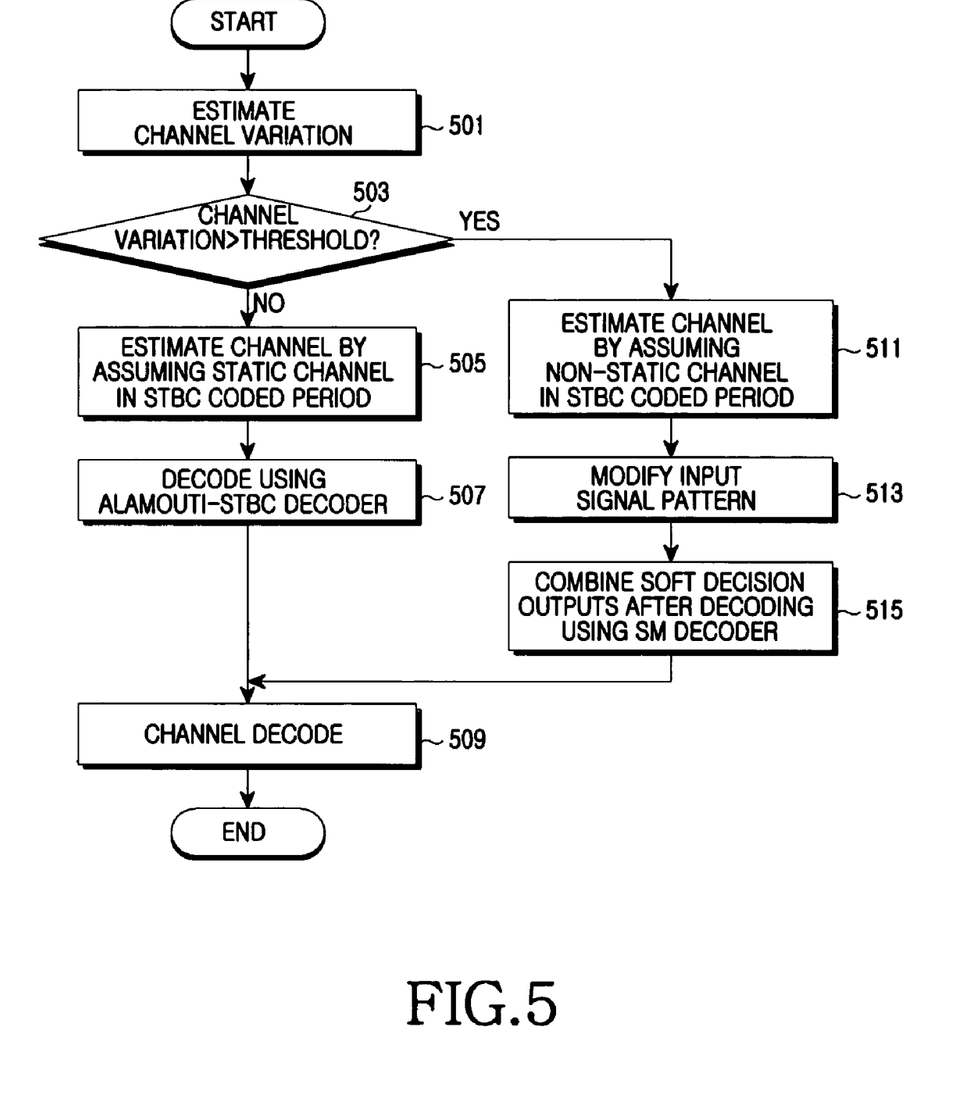
FIG. 5 illustrates operations of the receiver for adaptively decoding the receive signal based on the channel variation in the communication system according to an exemplary embodiment of the present invention.

FIG. 5 is a flowchart outlining operations of the receiver for adaptively decoding the receive signal based on the channel variation in the communication system according to an exemplary embodiment of the present invention. Particularly, the receiver operates in the Alamouti-STBC mode.

The receiver estimates the channel variation in the two successive symbol (or subcarrier) periods in step 501, and compares the estimated channel variation with the threshold in step 503. Herein, the threshold is preset to determine whether the corresponding channel is the static channel or the non-static channel.

When the channel variation is less than or equal to the threshold, the receiver estimates the channel by assuming that the channel corresponding to the period adopting the Alamouti-STBC is the static channel in step 505. Next, the receiver decodes the signal using the Alamouti-STBC decoder in step 507, decodes the channel in step 509, and finishes this process.

By contrast, when the channel variation is greater than the threshold, the receiver estimates the channel by assuming that the channel corresponding to the period adopting the Alamouti-STBC is the non-static channel in step 511. In step 513, the receiver regulates the input pattern of the signal received via the antennas. For example, the receiver regulates the pattern of the input signal to provide the signals received via the first antenna in the successive two symbol (or subcarrier) periods to the SM decoder 311 at the same time, and regulates the pattern of the input signal to provide the signals received via the second antenna in the successive two symbol (or subcarrier) periods to the SM decoder 311.

In step 515, the receiver decodes the signals input from the antennas using the SM decoder having the square channel matrix and combines the soft decision outputs. For example, the receiver acquires the soft decision output by decoding the signals received over the first antenna in the two successive symbol (or subcarrier) periods using the square channel matrix, acquires the soft decision output by decoding the signals received over the second antennas in the two successive symbol (or subcarrier) periods, and combines the two soft decision outputs.

The receiver decodes the channel in step 509 and then finishes this process.

Figure 6A:
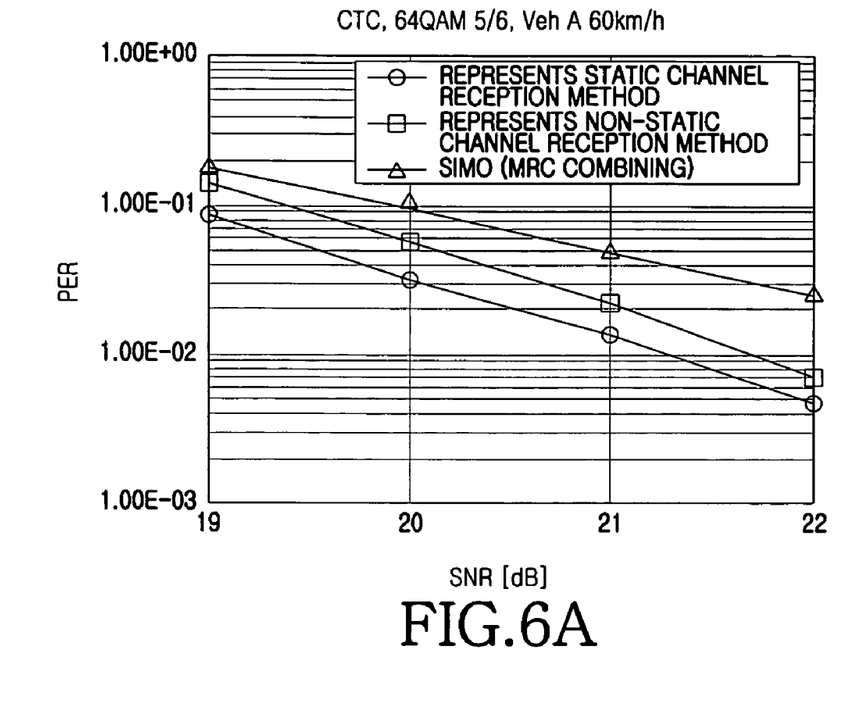
FIGS. 6A and 6B illustrate a received signal decoding performance of the present receiver and a conventional Single-Input Multiple-Output (SIMO) system.
Figure 6B:
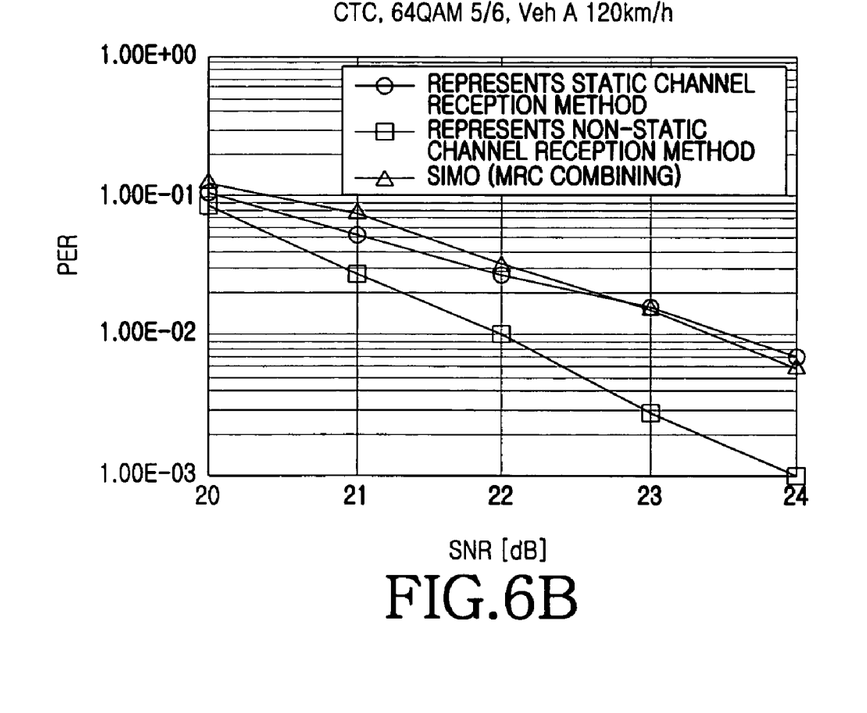

FIGS. 6A and 6B are graphs showing a received signal decoding performance of the present receiver and a conventional Single-Input Multiple-Output (SIMO) system. The horizontal axis indicates a Signal to Noise Ratio (SNR) and the vertical axis indicates a Packet Error Ratio (PER).

FIGS. 6A and 6B are the performance graphs based on the movement velocity of a terminal affecting the channel variation when the Alamouti-STBC is adopted. According to the movement velocity of the terminal, the performance superiority of the received signal decoding apparatus changed between the received signal decoding method based on the static channel and the received signal decoding method based on the non-static channel.

Given the movement velocity 60 km/h of the terminal in FIG. 6A, the performance of decoding the receive signal based on the static channel is superior to the performance of decoding the receive signal based on the non-static channel. The performance of decoding the receive signal based on the static channel is superior to the SIMO having the reception diversity effect. Given the velocity 120 km/h of the terminal in FIG. 6B, the performance of decoding the receive signal based on the non-static channel is superior to the performance of decoding the receive signal based on the static channel and the SIMO having the reception diversity effect.

In conclusion, the performance relies on the threshold of the channel variation which determines the static channel and the non-static channel.

Figure 7:
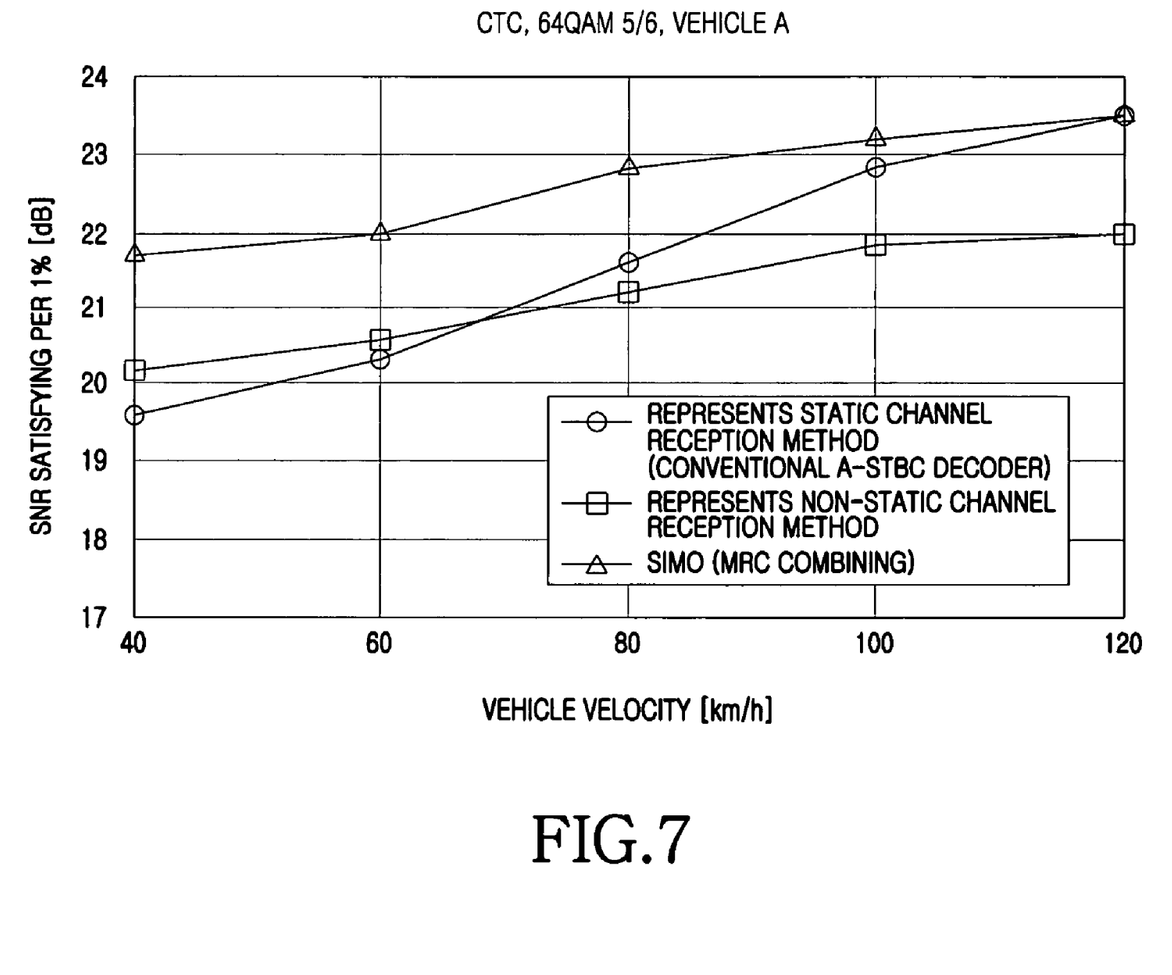
FIG. 7 illustrates a Signal to Noise Ratio (SNR) based on a movement velocity of a terminal in the present receiver and the conventional SIMO system.

FIG. 7 is a graph showing the SNR based on a movement velocity of a terminal in the present receiver and the conventional SIMO system. The horizontal axis indicates the movement velocity of the terminal and the vertical axis indicates the SNR required to satisfy the PER 1%.

When the movement velocity of the terminal falls below a certain value, the performance of decoding the receive signal based on the static channel is superior. When the movement velocity of the terminal exceeds the certain value, the performance of decoding the receive signal based on the non-static channel is superior.

Thus, by setting the appropriate threshold for the channel variation, the higher reception performance can be achieved over the SIMO by adaptively using the received signal decoding method based on the static channel and the received signal decoding method based on the non-static channel in accordance with the situation.

As set forth above, the receiver of the communication system adaptively carries out the Alamouti-STBC decoding or the SM decoding according to the channel variation using the SM decoder having the square channel matrix. In the great channel variation, the complexity of the receiver can be minimized and the reception performance can be enhanced by means of the SM decoder. In the little channel variation, the optimal reception performance can be guaranteed as in the conventional method.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for adaptively decoding based on a channel variation at a receiver of a communication system capable of supporting an Alamouti mode and a Spatial Multiplexing (SM) mode, the apparatus comprising:
a channel variation estimator configured to estimate the channel variation;
a channel estimator configured to estimate a channel value of successive channel periods or a channel value of each channel period by comparing the estimated channel variation with a threshold;
an Alamouti decoder configured to decode a receive signal using an Alamouti method when the estimated channel variation is less than or equal to the threshold;
a Spatial Multiplexing (SM) decoder configured to decode the receive signal using an SM method having a square channel matrix when the estimated channel variation is greater than the threshold; and
an input scheduler configured to regulate an input pattern of the receive signal according to a supporting mode of the receiver, provide the regulated signal to the SM decoder, when the receiver supports the Alamouti mode, regulate the input pattern of the receive signal so as to provide signals received via a specified one of a plurality of antennas in a specified number of successive periods to the SM decoder at the same time, and when the receiver supports the SM mode, regulate the input pattern of the receive signal so as to provide signals received via each of the antennas in one period to the SM decoder at the same time when the receiver supports the SM mode.

2. The apparatus of claim 1, wherein the receiver is configured to support the Alamouti mode when the receiver receives Alamouti-encoded signals from a first transmitter and to support the SM mode when the receiver receives SM-encoded signals from a second transmitter.

3. The apparatus of claim 1, further comprising:
a selector configured to provide the receive signal to the Alamouti decoder when the estimated channel variation is less than or equal to the threshold and to provide the receive signal to the SM decoder when the estimated channel variation is greater than the threshold.

4. The apparatus of claim 1, wherein the channel variation estimator is configured to utilize a Doppler spread estimator when the Alamouti method is applied in a time axis and a space axis and to utilize a delay spread estimator when the Alamouti method is applied in a frequency axis and a space axis.

5. The apparatus of claim 1, wherein the channel estimator is configured to determine a static channel when the estimated channel variation is less than or equal to the threshold and estimates the same channel value in the successive symbol or subcarrier periods and to determine a non-static channel when the estimated channel variation is greater than the threshold and estimates a channel value of each symbol or subcarrier.

6. The apparatus of claim 1, further comprising a soft output combiner configured to combine a certain number of successive soft decision outputs that are output from the SM decoder.

7. A method for adaptively decoding based on a channel variation at a receiver of a communication system capable of supporting an Alamouti mode and a Spatial Multiplexing (SM) mode, the method comprising:

estimating the channel variation;
estimating a channel value of successive channel periods or a channel value of each channel period by comparing the estimated channel variation with a threshold; and
decoding a receive signal using an Alamouti method or using a Spatial Multiplexing (SM) method having a square channel matrix by comparing the estimated channel matrix with the threshold,
wherein the decoding of the receive signal comprises regulating an input pattern of the receive signal according to a supporting mode of the receiver, when the receiver supports the Alamouti mode, regulating the input pattern of the receive signal so as to apply the SM decoding to signals received via a specified one of a plurality of antennas in a specified number of successive periods at the same time, and when the receiver supports the SM mode, regulating the input pattern of the receive signal so as to apply the SM decoding to signals received via each of the antennas in one period at the same time.

8. The method of claim 7, wherein the decoding of the receive signal comprises:
decoding the receive signal using the Alamouti method when the estimated channel variation is less than or equal to the threshold, and decoding the receive signal using the SM method having the square channel matrix when the estimated channel variation is greater than the threshold.

9. The method of claim 7, wherein the receiver supports the Alamouti mode when the receiver receives Alamouti-encoded signals from a first transmitter and supports the SM mode when the receiver receives SM-encoded signals from a second transmitter.

10. The method of claim 7, wherein the estimating of the channel variation utilizes a Doppler spread estimator when the Alamouti method is applied in a time axis and a space axis, and utilizes a delay spread estimator when the Alamouti method is applied in a frequency axis and a space axis.

11. The method of claim 7, wherein the estimating of the channel determines a static channel when the estimated channel variation is less than or equal to the threshold and estimates the same channel value in the successive symbol or subcarrier periods, and determines a non-static channel when the estimated channel variation is greater than the threshold and estimates a channel value of each symbol or subcarrier.

12. The method of claim 7, further comprising combining a certain number of successive soft decision outputs acquired by decoding using the SM method.

13. A method for adaptively decoding based on a channel variation at a receiver of a communication system capable of supporting an Alamouti mode and a Spatial Multiplexing (SM) mode, the method comprising:
estimating the channel variation;
estimating a channel value of successive channel periods or a channel value of each channel period by comparing the estimated channel variation with a threshold;
if the estimated channel variation is less than or equal to the threshold, decoding a receive signal using an Alamouti method; and
if the estimated channel variation is greater than the threshold, decoding the receive signal using a Spatial Multiplexing (SM) method having a square channel matrix when the estimated channel variation is greater than the threshold,
wherein the decoding of the receive signal using an SM method comprises regulating an input pattern of the receive signal according to a supporting mode of the receiver, when the receiver supports the Alamouti mode, regulating the input pattern of the receive signal so as to apply the SM decoding to signals received via a specified one of a plurality of antennas in a specified number of successive periods at the same time, and when the receiver supports the SM mode, regulating the input pattern of the receive signal so as to apply the SM decoding to signals received via each of the antennas in one period at the same time.

14. The method of claim 13, wherein the receiver supports the Alamouti mode when the receiver receives Alamouti-encoded signals from a first transmitter and supports the SM mode when the receiver receives SM-encoded signals from a second transmitter.

15. The method of claim 13, wherein estimating the channel variation utilizes a Doppler spread estimator when the Alamouti method is applied in a time axis and a space axis and utilizes a delay spread estimator when the Alamouti method is applied in a frequency axis and a space axis.

16. The method of claim 13, wherein estimating the channel variation comprises determining a static channel when the estimated channel variation is less than or equal to the threshold and estimating the same channel value in the successive symbol or subcarrier periods, and determining a non-static channel when the estimated channel variation is greater than the threshold and estimates a channel value of each symbol or subcarrier.

17. An apparatus for adaptively decoding based on a channel variation at a receiver of a communication system capable of supporting an Alamouti mode and a Spatial Multiplexing (SM) mode, the apparatus comprising:
means for estimating a channel value of successive channel periods or a channel value of each channel period by comparing an estimated channel variation with a threshold; and
means for decoding a receive signal using an Alamouti method or using a Spatial Multiplexing (SM) method having a square channel matrix by comparing the estimated channel matrix with the threshold,
wherein the decoding of the receive signal comprises regulating an input pattern of the receive signal according to a supporting mode of the receiver, when the receiver supports the Alamouti mode, regulating the input pattern of the receive signal so as to apply the SM decoding to signals received via a specified one of a plurality of antennas in a specified number of successive periods at the same time, and when the receiver supports the SM mode, regulating the input pattern of the receive signal so as to apply the SM decoding to signals received via each of the antennas in one period at the same time.

* * * * *